United States Patent
Paatz et al.

(10) Patent No.: US 6,203,761 B1
(45) Date of Patent: Mar. 20, 2001

(54) FLUIDIZED BED APPARATUS HAVING SPRAY CHAMBER WITH PIVOTAL SLATS

(75) Inventors: Kathleen Paatz, Duesseldorf (DE); Werner Pichler, Kundl (AT); Wilfried Raehse, Duesseldorf; Hans Raker, Monheim, both of (DE)

(73) Assignee: Henkel Kommandigesellschaft Auf Aktien, Duesseldorf (DE)

( * ) Notice: Subject to any disclaimer, the term of this patent is extended or adjusted under 35 U.S.C. 154(b) by 0 days.

(21) Appl. No.: 09/284,758

(22) PCT Filed: Oct. 15, 1997

(86) PCT No.: PCT/EP97/05694
§ 371 Date: Apr. 20, 1999
§ 102(e) Date: Apr. 20, 1999

(87) PCT Pub. No.: WO98/17380
PCT Pub. Date: Apr. 30, 1998

(30) Foreign Application Priority Data

Oct. 24, 1996 (DE) .................................. 196 44 244

(51) Int. Cl.[7] .......................... F27B 15/14; F27B 15/02; B01J 2/16
(52) U.S. Cl. ...................... 422/143; 422/146; 422/140; 34/585; 34/588
(58) Field of Search .................. 34/585, 588, 594; 118/DIG. 5; 422/140, 143, 146

(56) References Cited

U.S. PATENT DOCUMENTS

| | | | |
|---|---|---|---|
| 4,891,170 | * 1/1990 | Kokkonen et al. | 261/116 |
| 4,970,804 | 11/1990 | Huttlin | 34/589 |
| 5,085,170 | 2/1992 | Huttlin | 118/303 |
| 5,282,321 | 2/1994 | Huttlin | 34/594 |
| 5,547,129 | 8/1996 | Fortunato et al. | 239/132.3 |

FOREIGN PATENT DOCUMENTS

| | | |
|---|---|---|
| 38 39 723 | 7/1989 | (DE) . |
| 195 28 584 | 2/1997 | (DE) . |
| 0 292 314 | 11/1988 | (EP) . |
| 0 331 112 | 9/1989 | (EP) . |
| 0 370 167 | 5/1990 | (EP) . |
| WO92/21439 | 12/1992 | (WO) . |

* cited by examiner

*Primary Examiner*—Shrive Beck
*Assistant Examiner*—Susan Ohorodnik
(74) *Attorney, Agent, or Firm*—Wayne C. Jaeschke; Glenn E. J. Murphy

(57) ABSTRACT

A fluidized bed apparatus for the production and treatment of granules and a method for its operation is provided. The fluidized bed apparatus includes an entry chamber through which a gas is designed to flow upwards; a fluidization chamber for fluidizing the material located above the entry chamber; pivotal slats located between the entry chamber and the fluidization chamber; and a nozzle arm located in the chamber below the slats with a nozzle line ending in a nozzle which is directed into the fluidization chamber through cutouts in the slats and extends partly into the fluidization chamber. The fluidized bed apparatus has rigid nozzle arms and lines which are easily jacketed for heating and cooling applications.

15 Claims, 5 Drawing Sheets

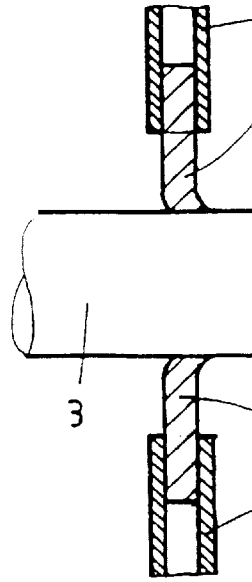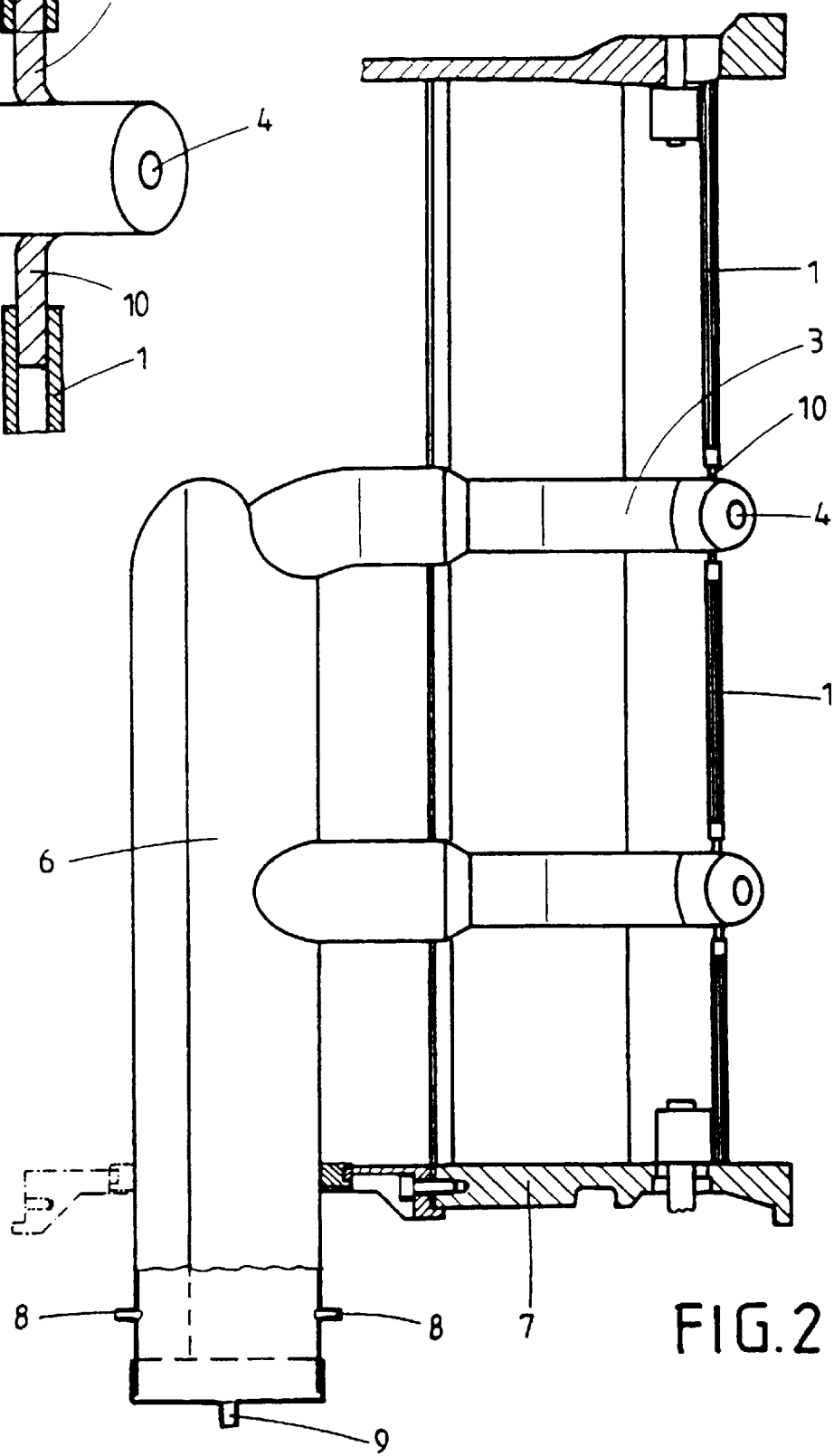

FLUIDIZED BED APPARATUS HAVING SPRAY CHAMBER WITH PIVOTAL SLATS

FIELD OF THE INVENTION

1. Background of the Invention

This invention relates to a fluidized bed apparatus for the production and/or further treatment of granules comprising

- a container with an entry chamber through which a gas, especially air, is designed to flow upwards and a fluidization chamber for fluidizing the material located above the entry chamber;
- pivotal slats disposed between the entry chamber and the fluidization chamber and
- at least one nozzle arm disposed in the container below the slats and having at least one nozzle line which carries a nozzle directed into the fluidization chamber for introducing materials to be granulated.

The fluidized bed apparatus according to the invention is also intended to be suitable in particular for coating temperature-sensitive granules, for example enzymes, by spraying on molten material.

2. Discussion of Related Art

It is known that materials to be granulated can be introduced into the fluidized bed of a fluidized bed apparatus by various nozzle arrangements through which the materials to be granulated are sprayed onto the granules. Aqueous solutions of materials to be granulated or granulation aids are normally introduced through nozzles disposed above the fluidized bed, i.e. downwards. This arrangement protects the nozzles against soiling by the granules. However, it has disadvantages where the materials to be granulated are molten because the relatively large distance from the nozzles to the fluidized bed leads to premature cooling and hence to solidification of the melt. A shorter distance for the sprayed molten material to travel can be achieved by using an upwardly directed spray arrangement in which the nozzles are located immediately beneath the fluidized bed. In this case, the melt advantageously cools and solidifies only after it has impinged on the granules.

Accordingly, the distance between the nozzle orifices and the fluidized bed should preferably be as short as possible. At the same time, however, granules should not cake on the nozzles or the nozzle lines. This requirement is satisfied if only the nozzle orifices project into the fluidized bed and the nozzle lines are disposed beneath the fluidized bed, i.e. substantially within the entry chamber.

A fluidized bed apparatus such as this corresponding to the type mentioned at the beginning is known from DE 38 39 723 C1 or EP 0 370 167 B1. This fluidized bed apparatus has an at least substantially cylindrical container and the sector-like, radially aligned, partly overlapping slats designed to pivot about their longitudinal axis cause the upwardly directed gas stream to rotate about the container axis in operation. Four nozzle arms extend radially inwards immediately beneath the slatted base. Each nozzle arm carries two nozzle lines each with one nozzle.

Eight narrow and four wide openings are present between adjacent slats in operation. In operation, the nozzle lines extend obliquely upwards in the wide openings so that only the upper part of the nozzle line projects into the fluidization chamber together with the nozzle. The remaining part of the spray arrangement, i.e. the nozzle arms and the greater part of the nozzle lines, is covered by the slats so that the granules in the fluidized bed are unable to cake on the spray arrangement.

If, at the beginning of the process, the material to be treated, for example coated, is introduced into the fluidization chamber, the slats designed to pivot about their longitudinal axis lie in their inoperative position in which they are substantially horizontal and lie sealingly one on top of the other. This prevents the material introduced from dropping through the slatted base into the entry chamber. By contrast, in the operative position, the slats extend obliquely and cause the upwardly flowing air to rotate.

In another known fluidized bed apparatus with a similar slatted base, the nozzles are fixedly arranged on the upper faces of certain slats. The nozzles are supplied with the melt through flexible lines. However, the flexibility of the nozzle lines lying within the entry chamber necessitated by the pivotability of the slats leads to the disadvantages discussed hereinafter.

In the operative state, the slats lie one on top of the other except for a gap of a few mm predetermined by spacers. During filling, air flows through the gaps, although at a lower throughput than during fluidization in order to prevent the product from dropping through the gaps. Accordingly, the air flow rate and the gap width are adapted to one another. The air flowing through the gaps during granulation causes the granules to rotate about the axis of the cylindrical container. By contrast, to empty the granules formed, the slats extend obliquely so that the product drops from the fluidization chamber through the slatted base into the entry chamber in the lower part of which the outlet is disposed.

In order in the case of the fluidized bed apparatus according to EP 0 370 167 B1 to pivot the slats from their oblique position into their horizontal position, the nozzle lines have to be turned about the longitudinal axis of the nozzle arm away from the openings between the slats before the slats are brought from their oblique position into their horizontal position. In the known fluidized bed apparatus, the necessary, structurally complex rotatability of the nozzle arm requires a flexible feed line, for example a hose, for the liquid to be sprayed.

If melts are to be sprayed, problems arise as, for example, in the case of molten nonionic surfactants. This is because the melt has to be kept at an elevated temperature throughout the line in the interests of problem-free delivery. Accordingly, heating of the feed line is generally unavoidable. On the other hand, with the feed lines lying within the entry chamber, the outside must not exceed a certain temperature in order to avoid caking of the granules and hence frequent cleaning of the apparatus. In addition to being heated, therefore, the feed line has to be externally insulated and/or cooled, at least in the vicinity of the entry chamber.

In the case of a flexible and pivotal feed line for the melt to be sprayed, these requirements lead to major design problems. If, for example, electrically heated, externally insulated hoses are used in the flexible feed line, the internal hose undergoes thermal expansion after a short period of operation, resulting in inadequate heating and insulation.

Another disadvantage of the prior art as represented by EP 0 370 167 B1 is that, when the slats are moved from their oblique to their horizontal position and vice versa, the four nozzle arms also have to be swung downwards and upwards, respectively.

DESCRIPTION OF THE INVENTION

The problem addressed by the present invention was to avoid the above-mentioned disadvantages arising out of the pivotability of the slats in a fluidized bed apparatus of the type mentioned at the beginning in a simple and economic manner.

According to the invention, the solution to this problem is characterized in that the slats have cutouts through which the nozzle lines are guided so that they extend partly into the fluidization chamber, the cutouts being sufficiently large for the pivoting movement of the slats.

The cutouts are preferably sealed off from the nozzle lines by a flexible material. However, sealing is not absolutely essential provided that an adequate flow of air from the entry chamber into the fluidized bed chamber ensures that the granules do not drop through the cutouts.

According to the invention, nozzle arms rigidly arranged in the fluidized bed apparatus with non-flexible nozzle lines may be used so that the design of the heating, thermal insulation and cooling system is no longer restricted by the need for pivotability or flexibility. The pivotability of the slats is not impeded because the cutouts provided in the slats for the nozzle lines are sufficiently large. The effective thermal insulation and cooling which is possible through the rigidity of the nozzle arm prevents the granules from caking on the nozzle lines during the filling and emptying of the fluidized bed apparatus. The optional flexible seal is more effective than the covering of the nozzle lines lying freely in the wide openings between the slats during the operation of the known fluidized bed apparatus according to EP 0 370 167 B1.

The flexible material preferably consists of rubber. Even in cases where hot melts are to be sprayed, a rubber seal may be used because the rigidity of the nozzle arms allows effective thermal insulation and cooling of the nozzle lines so that even temperature-sensitive sealing materials may be used.

In another embodiment of the invention, the slats have a two-layer structure, the flexible material lying between the layers at its outer edge. The advantages of this embodiment lie in the smooth surface, less wear and better sealing. In contrast to fixing with screws, tearing of the sealing material is avoided, even in the event of prolonged operation, nor are there any screwing points to be subjected to serious soiling.

The outer edge of the flexible material is preferably serrated to prevent edge wear.

For particularly effective heat insulation, the nozzle arms and/or the nozzle lines are surrounded by an evacuable jacket. The vacuum insulation is only made possible by the rigidity of the nozzle arms according to the invention.

In the case of hot melts to be sprayed, caking is avoided if the outside of the nozzle arms and/or the nozzle lines consist of a cooling jacket through which a cooling medium, for example air or water, flows in operation. In many cases, air with a temperature of around 20° C. is sufficient for this purpose.

If the fluidization chamber is emptied after the treatment process, for example after coating, as much of the end product as possible should drop through the slats and past the nozzle arms to the bottom of the entry chamber. To this end, the outer face on the upper side of the nozzle arm has the shape of a pointed roof, i.e. an inverted V. The lower side is preferably V-shaped, i.e. in the form of an inverted pointed roof.

In another advantageous embodiment of the invention, each nozzle arm has one to three, preferably two, nozzle lines.

Soiling of the nozzle arm with its nozzle lines is largely avoided if—apart from the nozzle insert—screw or similar connections are avoided. Another advantage is that there is no need to use seals which are also dirt traps in known apparatus. Accordingly, another embodiment of the invention is characterized in that the nozzle arms with their nozzle lines have only welded joints. This advantageous embodiment, too, is only made possible by the rigidity of the nozzle arm according to the invention. Since the nozzles are subject to wear, it is of advantage to connect them to the nozzle lines in a detachable manner, for example by screwing in.

The present invention also relates to a process for coating temperature-sensitive granules, for example enzymes, using the fluidized bed apparatus according to the invention. The molten coating material, which is kept at a temperature exceeding the melting temperature by at least 20° C., is preferably sprayed through the nozzles into the fluidization chamber filled with granules with air which has at least the same temperature and the outer jacket is kept at a temperature of 20 to 50° C. and preferably at a temperature of at most 40° C. The spraying air is additionally used to heat the feed passage for the melt.

The coating of enzyme granules (protease) which are used as a component of detergents is mentioned as an example. In order to obtain a white, visually attractive product with no enzyme dust from the granules which are brown and contain a certain amount of dust after the production process, the starting product is coated with a melt containing nonionic surfactants to which titanium dioxide has been added. The melt has a temperature of around 120° C.

An embodiment of the invention is described in detail in the following with reference to the accompanying drawings, wherein:

FIG. 2 is a section on the line II—II of FIG. 1.

FIG. 3 shows a detail from FIG. 2.

Figure 5:
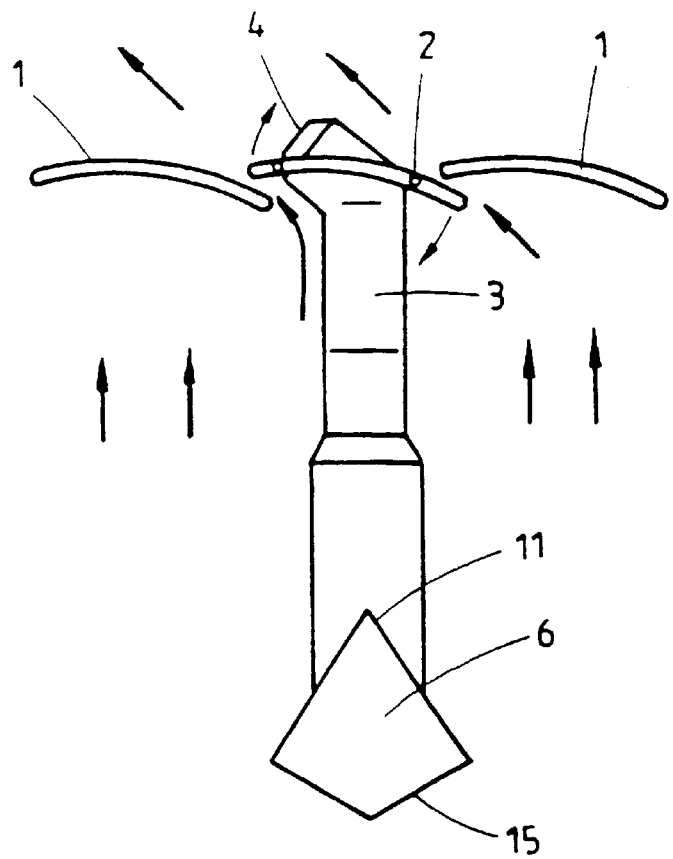
FIG. 5 shows the co-operation of slats with the nozzle lines when the slatted base is almost closed (operative state).
Figure 6:
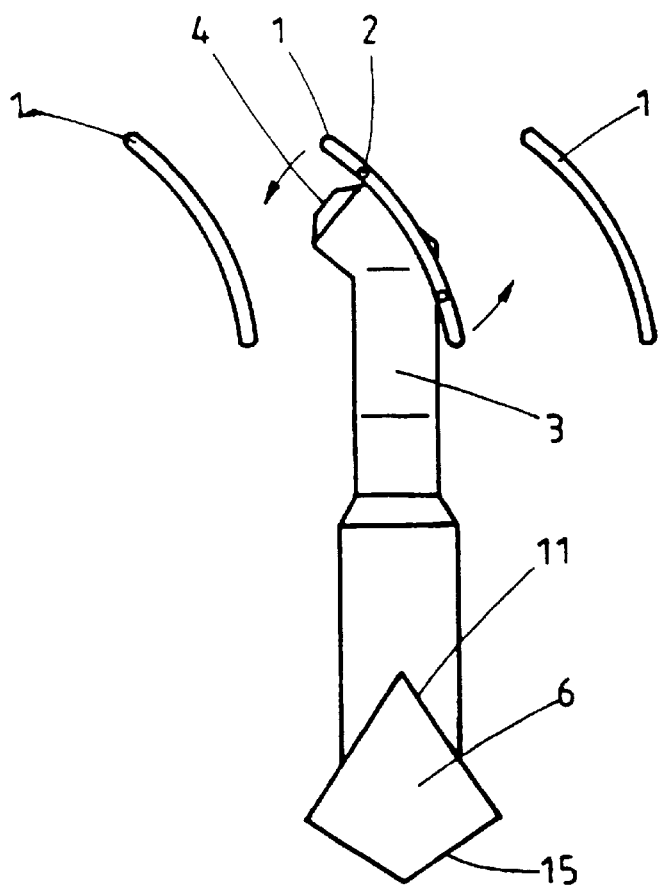

FIG. 6 corresponds to FIG. 5 and shows the slatted base in the open position (emptying position).

Figure 1:
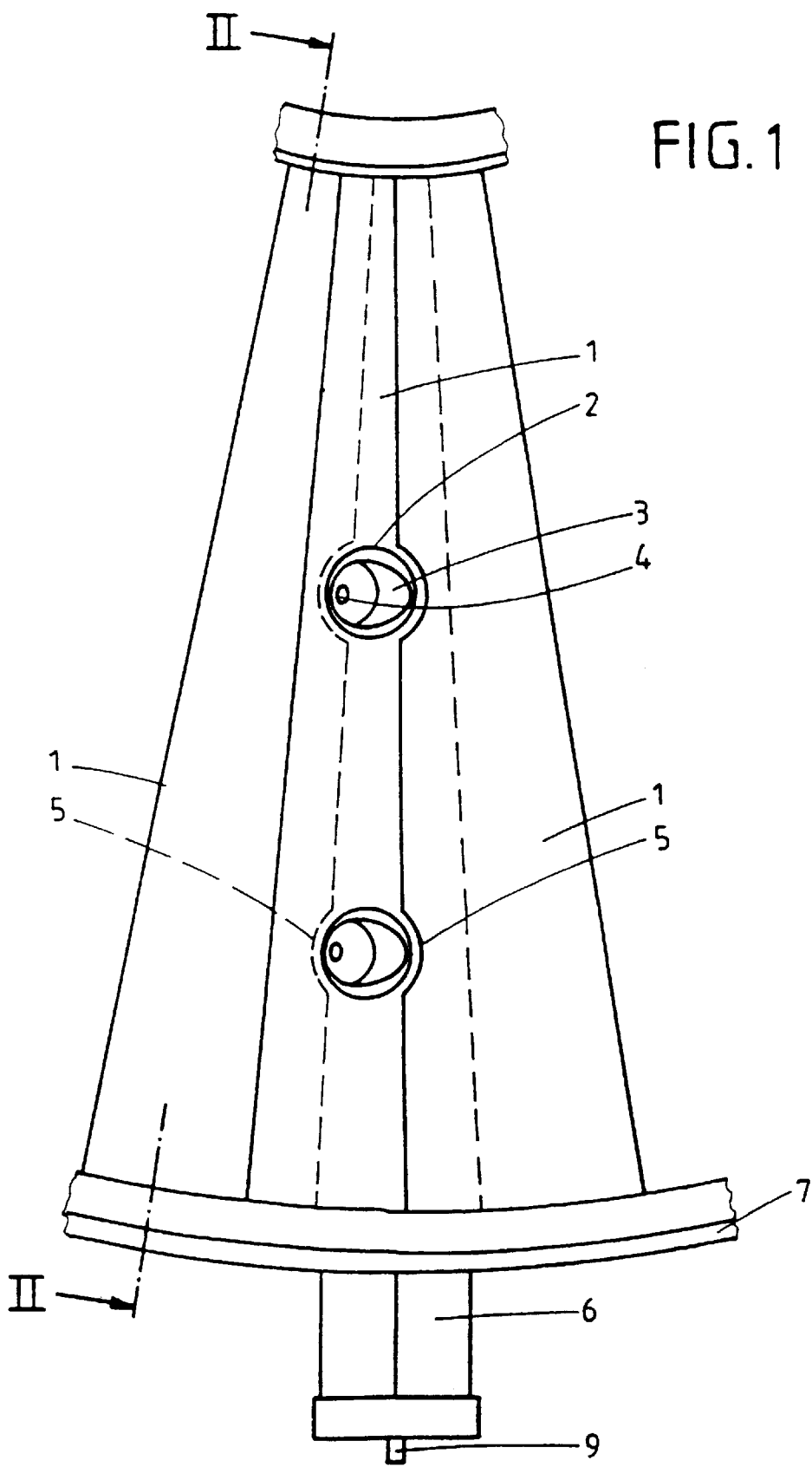
FIG. 1 is a plan view—partly in schematic elevation—of a slatted base of the fluidized bed apparatus according to the invention in the operative state for coating.
Figure 7:
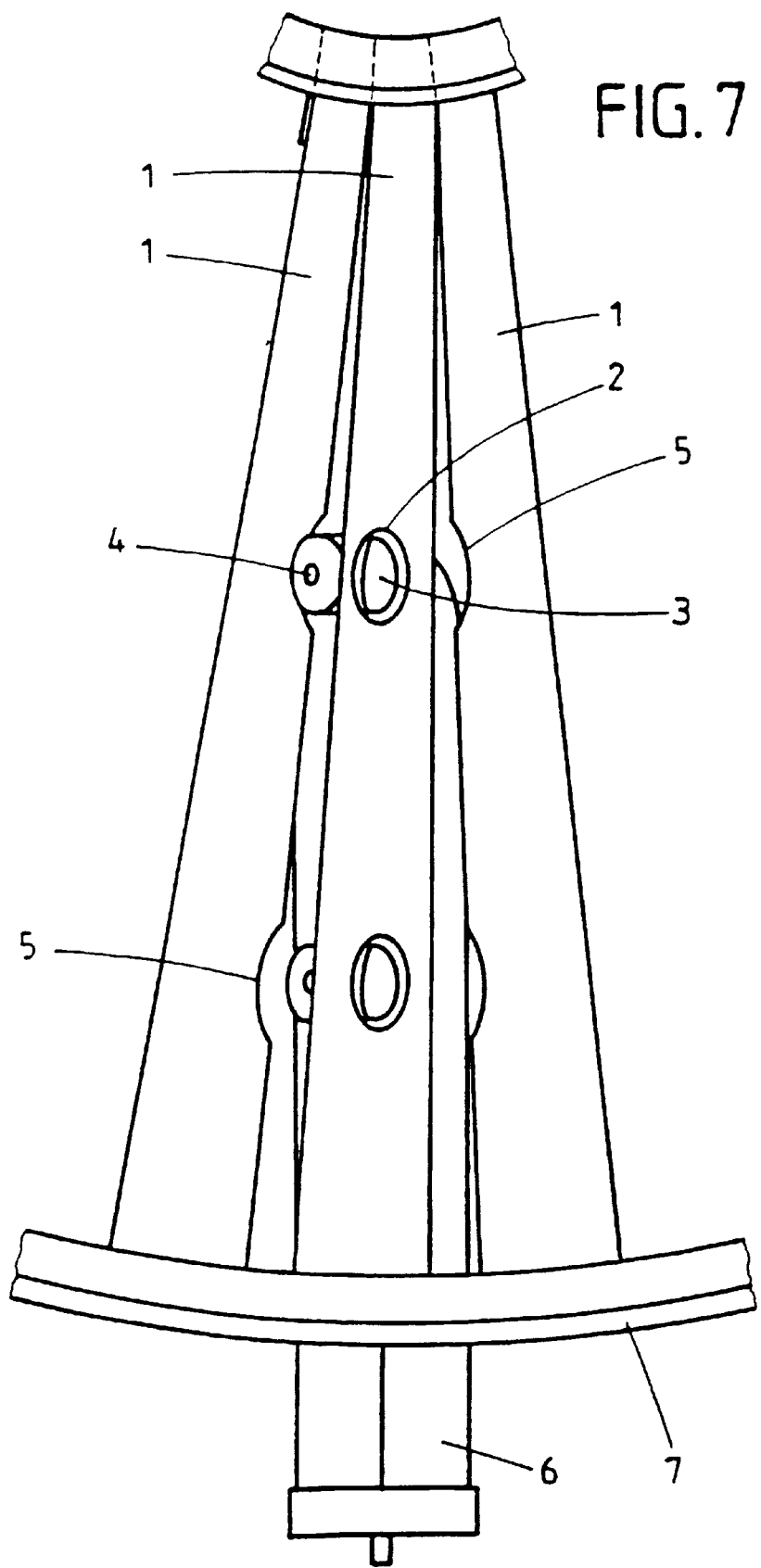

FIG. 7 is an elevation corresponding to FIG. 1 with the slatted base in the open position.

In all the drawings, the same reference numerals have the same meanings and, accordingly, may only be explained once.

The fluidized bed base projecting upwards from the fluidization chamber which is shown in part in FIG. 1 consists of a plurality of elongate sector-like slats 1 which overlap so that, in the operative position, they form a base which is only slightly open. In the interests of clarity, the spacers determining the minimum gap between the slats have not been shown. Nozzle lines 3 each with a nozzle 4 fitted at the end of the line project through cutouts 2 in the central slatted base 1 in FIG. 1. Openings 5 adapted to the cutouts 2 are provided at the edges—adjacent the nozzle lines—of the slats 1 adjoining the middle slat.

The nozzles 4 are supplied with the melt to be sprayed, the cooling air etc. through the nozzle lines 3 and the nozzle arm 6 rigidly adjoining them (FIG. 3). The nozzle arm 6 with two nozzle lines 3 and the nozzles 4 inserted therein is rigidly connected as a whole to the housing wall 7 of the fluidized bed apparatus and guided outwards through the wall 7. In the interests of clarity, only the feed line 8 for the cooling air and the feed line 9 for the melt to be sprayed on are shown in FIG. 2. The outside of the nozzle arm 6 facing the slats 1 has the shape of a pointed roof, i.e. an inverted V, so that when the fluidized bed apparatus is emptied the granules impinging on the nozzle arm 6 slide off and do not collect on the nozzle arm. The shape of the upper side 11 and lower side 15 of the nozzle arm 6 is apparent from FIGS. 5 and 6.

The nozzle arm 6 and the nozzle lines 3 have a vacuum jacket (not shown) and an outer cooling jacket (not shown) through which air at 20° C. flows, so that the outside has a temperature below 30° C. despite the >100° C. temperature of the melt.

Figure 4:
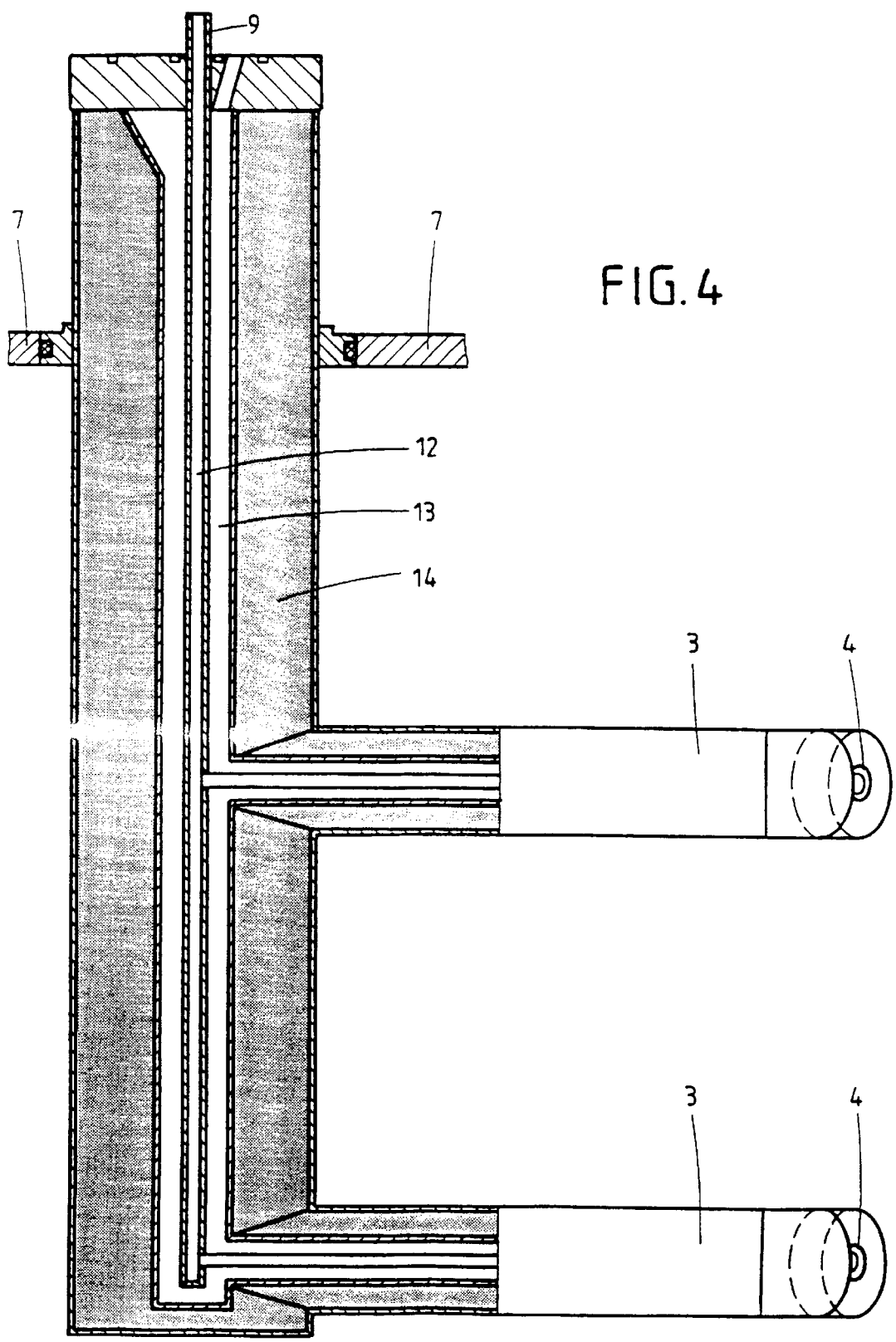
FIG. 4 is a longitudinal section through the nozzle arm shown in FIG. 2.

Another embodiment of the nozzle arm according to the invention is shown in longitudinal section in FIG. 4. Except for the screwed-in nozzles, all joints/connections are welded. The passage 12 for the hot melt is surrounded by a jacket 13 for the hot spraying air which in turn is surrounded by a thermal insulation 14 consisting in this case of a jacket containing a solid insulating material. As can be seen from FIG. 4, the nozzle arm with its nozzle lines 3 has this multilayer structure, which is only made economically possible by the rigidity of the nozzle arm and the nozzle lines, from the entrance through the housing wall 7 up to the nozzles.

Granules are prevented from dropping through the cutouts 2 by an annular rubber seal 10 of which the inner edge bears against the outside of the nozzle lines 3. The outer edge of the seal 10 is guided into the gap of the two-layer slat where it is fixedly connected to the slat 1. FIG. 3 shows the seal 10 sealing off the nozzle line 3 from the slat 1 in a non-perspective view.

FIGS. 5 and 6 show the slats 1 already shown in FIG. 1 together with a nozzle line 3 in the operative and emptying positions, respectively, of the fluidized bed apparatus. The thin arrows indicate the direction in which the slats 1 pivot while the thick arrows in FIG. 5 represent the flow of the fluidizing air.

The cutouts 2 enable the slats 1 to pivot freely about their longitudinal axis. In the operative state (FIG. 5), therefore, the nozzles lie above the slats 1. The gaps between the slats are about 3 mm wide. During the emptying of the fluidized bed apparatus, the nozzles 4 are arranged below the associated slat 1 so that granules dropping down do not impinge on the nozzles at all or hardly at all (FIG. 6). This situation with the slat base in its position of maximum opening is also schematized in FIG. 7 which, like FIG. 1, is a plan view of the slatted base.

LIST OF REFERENCE NUMERALS 1 slat
2 cutout
3 nozzle line
4 nozzle
5 Opening
6 nozzle arm
7 housing wall
8 feed line (cooling air)
9 feed line (melt)
10 rubberseal
11 Upperside
12 passage for melt
13 passage for spraying air
14 heat insulation
15 lower side

What is claimed is:

1. A fluidized bed apparatus for the production or treatment of a granular material comprising:

(a) a container with an entry chamber through which a gas is designed to flow upwards, (b) a fluidization chamber located above the entry chamber, (c) at least one pivotal slat (1) arranged between the entry chamber and the fluidization chamber, and (d) at least one nozzle arm (6) rigidly arranged in the container below the slat (1) and having at least one nozzle line (3) that carries at least one nozzle (4) directed into the fluidization chamber for introducing materials to be granulated, wherein each slat (1) has a cutout (2) through which the nozzle line (3) is guided so that it extends partly into the fluidization chamber, the cutout (2) being sufficiently large for pivoting movement of the slat (1).

2. The fluidized bed apparatus of claim 1 wherein the at least one nozzle line (3) is made of a non-flexible material.

3. The fluidized bed apparatus of claim 1 wherein each cutout (2) is sealed off from the nozzle line or lines (3) by a flexible material (10).

4. The fluidized bed apparatus of claim 3, wherein the flexible material (10) comprises rubber.

5. The fluidized bed apparatus of claim 3, wherein the slat (1) has a two-layer structure, wherein the flexible material (10) has an outer edge lying between the layers of the slat.

6. The fluidized bed apparatus of claim 5, wherein the outer edge of said flexible material is serrated.

7. The fluidized bed apparatus of claim 1 wherein the nozzle arm (6) and the nozzle line (3) are surrounded by an evacuable jacket.

8. The fluidized bed apparatus of claim 1 wherein each of the nozzle arm (6) and nozzle line (3) is surrounded by a cooling jacket.

9. The fluidized bed apparatus of claim 1 wherein the nozzle arm (6) has an upper side (11) shaped to allow the granular material to drop past the nozzle arm.

10. The fluidized bed apparatus of claim 1 wherein the nozzle arm (6) comprises from one to three nozzle lines (3).

11. The fluidized bed apparatus of claim 10 wherein the nozzle arm (6) has two nozzle lines (3).

12. The fluidized bed apparatus of claim 1 wherein the nozzle arm (6) and nozzle line (3) consist of welded joints and connections.

13. A process for coating temperature-sensitive granules using the fluidized bed apparatus of claim 12, wherein each of the nozzle arm (6) and nozzle line (3) is surrounded by a jacket maintained at a temperature of 20° C. to 50° C., comprising:

(a) introducing granules into the fluidization chamber;

(b) fluidizing said granules; and (c) spraying molten coating material, having a temperature of at least 20° C. greater than the melting temperature of the coating material, through the nozzle (4) into the fluidization chamber using air having a temperature equal to or greater than that of the molten coating material, said coating material coating said granules to form a coated granule.

14. The process of claim 13 wherein the nozzle arm (6) and nozzle line (3) jackets are maintained at a maximum temperature of 40° C.

15. The process of claim 13 wherein the granules coated in the fluidization chamber comprise an enzyme.

* * * * *